United States Patent [19]
Bompard et al.

[11] Patent Number: 5,484,642
[45] Date of Patent: Jan. 16, 1996

[54] TEXTILE MATERIAL USEFUL FOR PRODUCING COMPOSITE LAMINATED ARTICLES BY INJECTION MOLDING

[75] Inventors: Bruno Bompard, Lyon; Jean Aucagne, La Tour Du Pin; Bernard Lapresle, Lyon, all of France

[73] Assignee: Brochier S.A., Decines Charpieu, France

[21] Appl. No.: 965,519

[22] Filed: Oct. 23, 1992

Related U.S. Application Data

[63] Continuation of Ser. No. 408,460, Sep. 15, 1989, abandoned, which is a continuation of Ser. No. 117,093, Nov. 5, 1987, abandoned.

[30] Foreign Application Priority Data

Nov. 5, 1986 [FR] France ................. 8615425

[51] Int. Cl.$^6$ ................. B32B 3/00; B32B 7/00; D02G 3/00
[52] U.S. Cl. ................. 428/166; 428/229; 428/233; 428/257; 428/284; 428/294; 428/377; 428/902
[58] Field of Search ................. 428/294, 245, 428/246, 298, 299, 301, 377, 397, 166, 229, 233, 257, 284, 902

[56] References Cited

U.S. PATENT DOCUMENTS

| | | | |
|---|---|---|---|
| 1,438,875 | 12/1922 | Taylor | 428/257 |
| 2,812,570 | 11/1957 | Petersilie et al. | 428/257 |
| 2,913,036 | 11/1959 | Smith | 154/1.6 |
| 3,036,602 | 5/1962 | Meyer et al. | 428/257 |
| 3,077,947 | 2/1963 | Peebles et al. | 428/257 |
| 3,461,025 | 8/1969 | Coleman et al. | 428/257 |
| 3,871,946 | 3/1975 | Romanski et al. | 139/383 R |
| 4,024,895 | 5/1977 | Barron | 139/426 R |
| 4,066,106 | 1/1978 | Graham | 428/258 |
| 4,350,731 | 9/1982 | Siracusano | 428/377 |
| 4,479,999 | 10/1984 | Buckley et al. | 428/245 |
| 4,500,593 | 2/1985 | Weber | 428/257 |
| 4,557,968 | 12/1985 | Thornton et al. | 428/259 |
| 4,563,385 | 1/1986 | Bhatt et al. | 428/257 |
| 4,571,355 | 2/1986 | Elrod | 428/239 |
| 4,622,091 | 11/1986 | Letterman | 428/110 |
| 4,800,113 | 1/1989 | O'Connor | 428/175 |
| 5,229,199 | 7/1993 | Miner et al. | 428/272 |

FOREIGN PATENT DOCUMENTS 0138294  4/1985  European Pat. Off.

*Primary Examiner*—James D. Withers
*Attorney, Agent, or Firm*—Wenderoth, Lind & Ponack

[57] ABSTRACT

Textile reinforcing material useful for producing composite laminated articles by a general injection-molding technique, which is fabricated by arranging a stack of layers having textile reinforcements in a mold of a shape corresponding to that of the article to be fabricated and, after the mold has been closed, injecting a resin into it. At least one layer of the stack of textile reinforcements has a structure in which ducts extend in at least one direction therein to facilitate the flow of the resin during injection.

13 Claims, 2 Drawing Sheets

TEXTILE MATERIAL USEFUL FOR PRODUCING COMPOSITE LAMINATED ARTICLES BY INJECTION MOLDING

This application is a continuation of Ser. No. 07/408,460 filed on Sep. 15, 1989, now abandoned, which is a continuation of Ser. No. 07/117,093 filed on Nov. 5, 1987, now abandoned.

BACKGROUND OF THE INVENTION

1. Field of the Invention

The present invention relates to textile material useful for producing composite laminated articles by injection molding, and more particularly by vacuum injection. This invention also relates to a process for producing such composite laminated articles by injection molding as well as the articles obtained comprising such a textile material.

Generally, conversion technologies for producing laminated (or composite) articles, that is to say materials having a textile reinforced resin base, can be grouped in two main categories, namely:

(a) those making it possible to produce articles at high rates, mainly involving the use of polyester or thermoplastic type resins reinforced with short fibers and processes such as compression, injection, and stamping, among others;

(b) those making it possible to produce articles at low rates, involving the use of sheet, webs, fabric or matt type-textile materials, and processes such as molding in an autoclave, by contact, in a vacuum, and other known molding techniques.

Of the technologies of type (b), the so-called "contact" processes are often relatively limited with respect to reliability and reproducibility and moreover, cause much pollution.

It should also be noted that in the technologies of type (b) labor is a large component of the final cost of the article.

However, the technologies of type (b) produce, as a whole, articles having mechanical properties that are better than those exhibited by articles produced by means of the high-rate processes of type (a).

There is therefore a tradeoff between mechanical properties and production rates in producing such articles, and in the present state of the art it has not been possible to find any satisfactory compromise between these two requirements. As a result of trends in the market for composite articles, there is a demand for technologies and materials making it possible to produce articles having high quality characteristics at sufficiently high production rates.

For some years, particularly in the sports and leisure industries, it has been proposed to produce large series of molded articles by the so-called "injection" technique, in particular using glass mats as reinforcing textile materials and polyester resins. The advantage of such a technology is that only a moderate investment is required, high production rates are possible, it can easily be automated, it does not cause pollution and the results are easily reproducible with high reliability. Although this technique is satisfactory when articles having relatively low mechanical properties are to be produced, when articles having a very high strength, that is to say having a high content of reinforcing textile material, are to be produced, it has been found that it is difficult and even impossible to carry out such a technique, since the textile reinforcements form a barrier preventing the resin from circulating and therefore preventing a complete and homogeneous impregnation of the reinforcements.

A reference illustrating the state of the art in the field of vacuum molding with resin injection is U.S. Pat. No. 2,913,036 which discloses a process for producing large-size articles, such as tanks or swimming pools. To make it easier to introduce the resin into the mold, it is proposed to provide a network of perforated tubes ensuring that the liquid resin is distributed more uniformly within the article during molding. This patent therefore describes a molding technique of the type described above, which cannot be used for producing composite materials comprising a stack of textile reinforcements. The technical problems raised are completely different if production rates sufficient for the industrial production of textile material are to be achieved.

To solve these problems, various methods have already been proposed which involve either injecting the resin under high pressure or making it highly fluid to allow it to penetrate more easily, or which involve a combination of the two. It has also been proposed to modify the textile reinforcements, for example by processing the fibers or the reinforcements chemically, carrying out preimpregnation of the various reinforcing layers, keeping the elementary filaments of the threads of the reinforcing fabrics as flat as possible and as parallel to one another as possible, and even producing perforated materials.

Although the proposed solutions may yield satisfactory results in some cases, it is nevertheless appropriate to note that, in general, these results are achieved at the expense of one or more relevant parameters of the injection-molding technique (more complex reinforcements, low-performance resin, high investment, etc.).

SUMMARY OF THE INVENTION

Now a textile material useful for producing composite laminated articles by injection molding and overcoming these disadvantages has been obtained according to the present invention.

According to the invention, laminated articles are produced by means of a conventional injection-molding technique, which involves arranging a stack of layers of textile reinforcements in a mold having a shape that corresponds to that of the article to be obtained and, after the mold has been closed, injecting a resin into it, at least one layer of the stack of textile reinforcements having a structure in which ducts extend in at least one direction in the stack for improving the flow of the resin during injection.

These ducts are maintained in their initial state until the impregnation of the stack of textile reinforcements with the injected resin is completed. Thus, the impregnation is quicker and more uniform than in the known injection processes.

When a material according to the invention is used in a vacuum-injection process, according to the geometry of the article to be produced, the resin can be injected either via a continuous peripheral pipe surrounding the article with suction being generated in the central part in such a way that the textile reinforcement is impregnated simultaneously from all sides, i.e. from the periphery towards the center (or alternatively injecting the resin at the center of the article and creating the vacuum along the periphery of the article), or by means of injection at one end with the vacuum being generated at the other end.

In the foregoing summary, the expression "ducts" has been used to characterize the flow of resin, during injection, in the stack of textile reinforcements. A person skilled in the art will realize that any equivalent expression could be used, such as "preferred passages", "corridors" or "drains", which define a configuration or structure capable of ensuring a guided flow of resin in at least one direction.

The ducts are defined next to one another. Alternatively, they can be separated from one another inside the reinforcement textile material. The ducts can be arranged in a straight line, a substantially straight line configuration or a curved configuration according to the shape of the final article to be produced. Indeed, the shape of the duct has to be adapted to that of the textile reinforcement, which can consist of a stack of substantially planar layers or which can comprise textile components, such as spiral, conic or frustoconic components, having a definite form or shape. Likewise, the ducts can be parallel or substantially parallel to one another or not parallel, according to the shape of the components of the textile reinforcement.

The ducts are continuous. They can be defined by using, to produce the material intended for forming the layer or layers in question of the stack, threads or yarns having a helical shape, such as covered or twisted threads and/or threads having a suitable surface state, such as polymerized, preimpregnated or hybrid threads or yarns.

Thus, in the textile material of the invention, the ducts can be obtained either as a result of the geometry of twisted or covered threads or as a result of the geometry of the cross-section of the polymerized preimpregnated or hybrids threads or yarns themselves.

In this specification and as known by those skilled in the art, a polymerized thread or yarn refers to a thread or yarn coated or impregnated with a substance which is in a polymerized state, whereas a preimpregnated thread or yarn refers to a thread or yarn coated or impregnated with a substance which is not yet in its final polymerization state, said state being obtained only at the end of the process of making the composite article.

The hybrid threads or yarns are threads or yarns comprising components of a different nature, for example carbon threads covered by a polyester thread or by several interwoven threads. The covered threads can have a single covering (with one thread) or a multiple covering, for example two interwoven threads. Likewise, the threads or yarns can have an external covering plait.

According to the invention, the nature of the threads or yarns is in no way critical and has only to be chosen in conformity with the technical features of the composite article to be produced. Generally speaking, threads or yarns comprising technical fibers such as glass, carbon, silicon carbide, aramide, boron fibers and the like, or mixtures thereof are preferred, but metallic wires can also be used such as aluminum wires. The threads or yarns can also be subjected to pretreatments known by those skilled in the art.

Also, according to the invention, very different threads or yarns can be used. The ducts are defined in at least one layer of the textile reinforcement by means of a lot of threads or yarns having various natures, shapes or surface states, for example having helical, round or substantially round shapes.

The ducts can be defined not only within the reinforcing layer, but also on each of its faces, thus making it possible to impregnate one or more adjacent layers of the stack.

The ducts make it possible, due to their geometry, to provide a flow of resin in the direction of the injection as well as in the direction of thickness of the reinforcing layer in question, in order to allow the adjacent layers to be impregnated.

A textile material corresponding to a preferred embodiment has at least one of the layers of the said stack formed from a warp and weft fabric, in which at least some of the warp and/or weft threads have either undergone sufficient twisting making it possible, when the fabric is produced, to define a duct between two consecutive threads, or have been covered by means of at least an additional thread, that is to say a thread wound on the periphery of the elementary filaments in the form of a helix and preferably carried out in nonadjoining turns in order to likewise obtain the desired duct.

Preferably, all the warp and weft threads of the layer in question will have the above-mentioned configuration, but it is possible to produce fabrics having, in the warp direction and/or in the weft direction, twisted threads (or covered) alternately disposed with non-twisted (or noncovered) threads.

It will be apparent to those skilled in the art that in the warp and weft fabrics as indicated in the present specification, the relative orientations of the warp and weft can be changed and that any appropriate orientation can be chosen, for example 0,90°+45°, −45° or +60°, −60° and the like.

If appropriate, instead of fabrics, a knitted material or a non-woven material may be used, provided that it has ducts according to the invention. Likewise, although the reinforcements can consist of stacked elementary layers, the invention can apply to thick materials consisting of parallel laps or webs connected to one another, for example by means of weaving, knitting, stitching, etc. Moreover, where articles having a complex form are concerned, it is possible to distribute ducts (density, width) so that injection takes place uniformly throughout the entire reinforcement.

Other embodiments according to the present invention include:

either the use of unidirectional warp (or weft) slivers or unidirectional laps or webs having, for example, only warp threads and no weft threads, but comprising preferred passages forming ducts which allow the resin to flow, or laying unit threads (for example, by means of a lap or filament-winding machine) between layers of conventional textile reinforcements, these unit threads providing preferred passages forming ducts allowing the resin to flow.

Thus, the textile material of the invention can be produced by using preformed fabrics (with warp and/or weft threads, such as those mentioned above) or unidirectional components (slivers or laps) which are placed in a stack of textile reinforcing layers. However, material according to the invention can also be produced in situ by arranging threads between the reinforcing layers of a stack during the placement thereof in the mold.

Those skilled in the art will understand that the invention is applicable to many textile materials and structures, including the following ones:

planar reinforcements consisting of monolayer woven, knitted or cliver structures with or without shrinking of the warp, or of non-woven unidirectional or multidirectional laps or webs;

planar reinforcements consisting of thick multilayer structures comprising stacks of layers connected to one another, non-planar reinforcements, having a shape corresponding to that of the final article to be produced, and comprising monolayer or multilayer structures, as mentioned above.

The invention can also be used to make it easier to impregnate special, for example thick textile materials, in order to obtain materials preimpregnated with resins conventionally used in these processes. This impregnation can be carried out by injection or by other impregnation techniques.

Likewise, the invention can be used in processes other than vacuum injection and, in general terms, in all cases when it is desirable to have a very good flow of resin within a textile reinforcing material.

Another aspect of this invention consists of the final composite articles comprising at least a textile material of the above-mentioned type.

Still another aspect of this invention is a process for producing composite articles by injection molding, with or without pressure, in which a reinforcement comprising at least one textile material of the types mentioned above is used.

BRIEF DESCRIPTION OF THE DRAWINGS

The description which follows will be made with reference to the accompanying drawings in which.

DETAILED DESCRIPTION OF THE PREFERRED EMBODIMENTS

Figure 1:
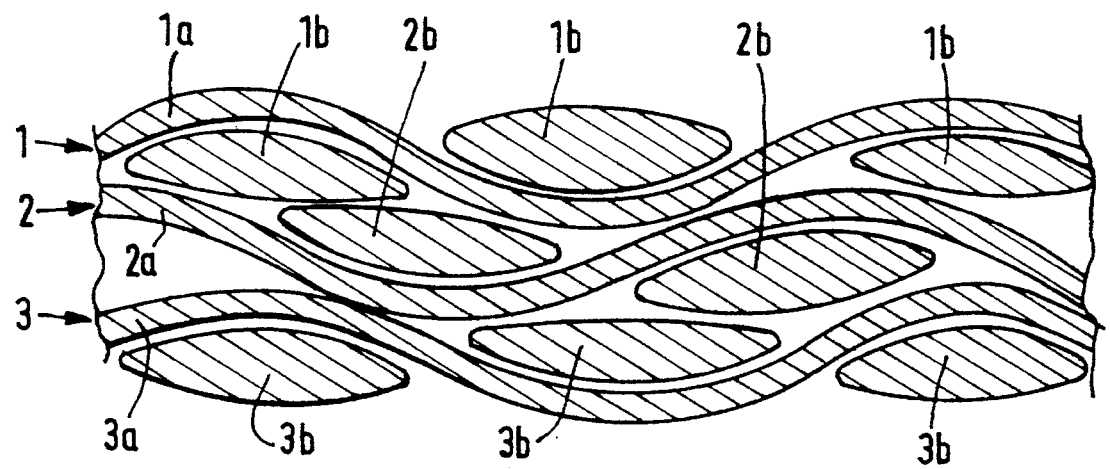
FIG. 1 is a schematic diagram, in section, of a stack of three textile reinforcing layers which is fabricated in a known way.

As illustrated schematically in FIG. 1, a conventional stack of three fabrics, intended to be used as textile reinforcement in composite articles comprises a first fabric (general reference 1) with warp (or weft) threads 1a and weft (or warp) threads 1b, a second similar fabric 2 formed from crossed threads 2a, 2b, and a third fabric 3 formed from crossed threads 3a, 3b. In the stack, the textile layers overlap one another, and thus form an obstacle to the flow of a resin injected in a liquid state through such material.

Figure 2:
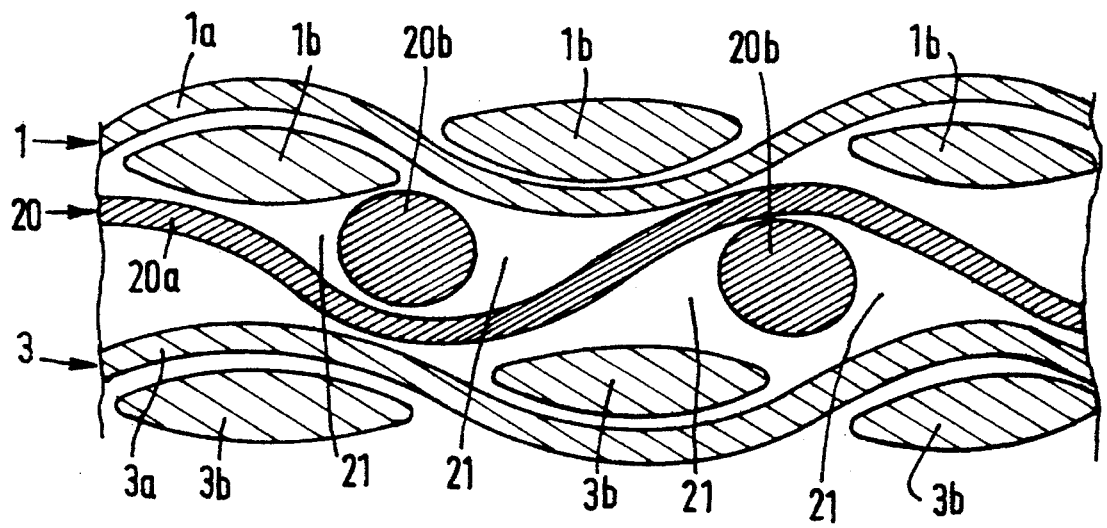
FIG. 2 is a view similar to that of FIG. 1, illustrating textile material according to the present invention.

FIG. 2 illustrates textile material according to the invention, comprising two outer layers 1, 3 formed from conventional fabrics with crossed threads 1a, 1b and 3a, 3b respectively, and a middle or inner layer 20 having crossing threads 20a, 20b, in which the threads 20b have a configuration that causes continuous ducts 21 to be defined in the direction of flow of the resin.

In the example illustrated, the threads 20b are placed next to one another, the continuous ducts 21 thus being formed at the periphery of each of these threads. In an alternative embodiment, the layer 20 need only have some threads 20b which are thus separated.

Likewise, the drawing is purely illustrative, showing a single layer 20 according to the invention. If necessary, the stack can comprise several layers of this type.

FIG. 2 clearly shows that the threads 20b can be formed in various ways, in order to arrive at the desired result, namely the formation of the ducts 21. It was said previously that, in the preferred embodiments, the threads 20b each have a helical outer surface, having been twisted or covered with at least an additional thread. However, equivalent results can be obtained with any threads, the surface state, shape or nature of which is such that ducts are defined adjacent the thread.

It will also be noted that, for the sake of simplification, the drawings show a stack of fabrics, but other alternative embodiments can be used, as hereinbefore described.

Figure 3:
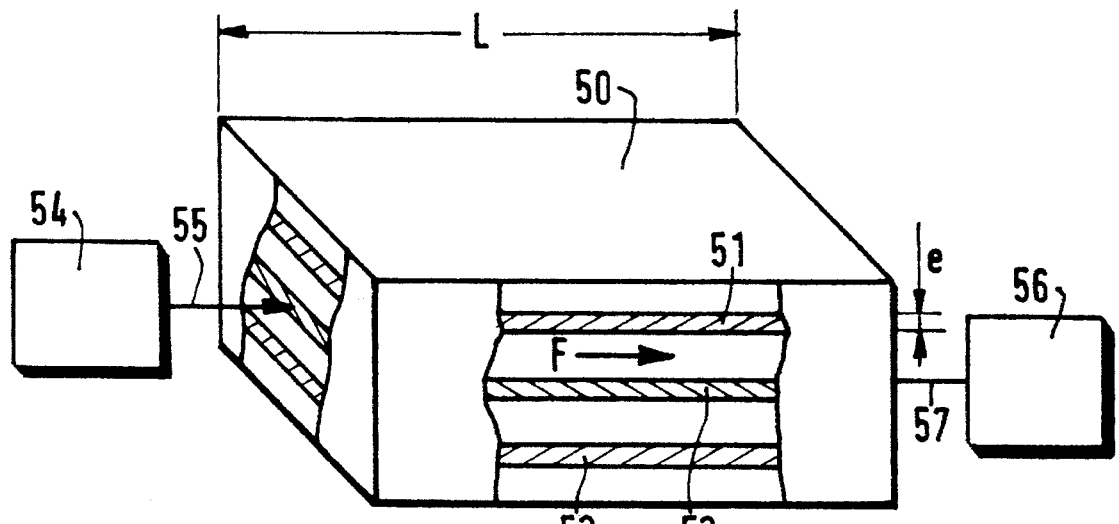
FIG. 3 is a schematic diagram of a vacuum-injection mold assembly for conducting production tests on composite articles having various textile reinforcements.

FIG. 3 shows, schematically, a vacuum-injection mold assembly used in tests described below. It comprises a mold 50 containing a stack of three textile reinforcing layers 51, 52, 53. The mold is connected, on one side, to known means 54 injecting resin at 55 and, on the other side, to a vacuum source 56 connected to the mold 50 at 57. The arrow F identifies the direction of flow of the resin. When a textile material according to the invention is used, the ducts of the layer or layers in question are arranged in the direction of the arrow F. The length of the mold is designated by L. In the tests which are described below, the length L was 85 cm, the thickness e of each textile reinforcing layer was approximately 5 cm, and the injection resin was a conventional epoxy resin (the same type of resin was used for all the tests). The injection process was carried out in a vacuum under no pressure.

Figure 4:
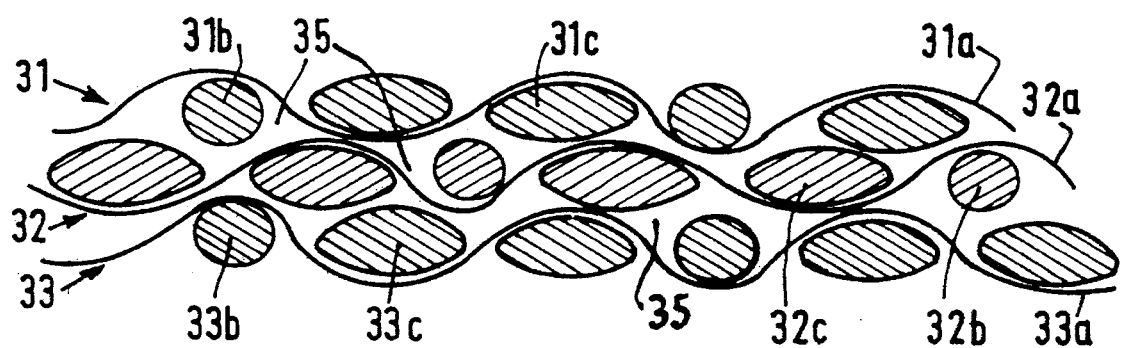
FIG. 4 is a schematic diagram, in section, of an alternative embodiment of the material according to the present invention.

FIG. 4 shows, schematically, in section, textile material according to the invention formed from unidirectional slivers, and suitable as a reinforcement for producing composite articles as a result of resin injected therein. This material comprises a stack of three slivers 31, 32, 33, of which the respective binding warps 31a, 32a, 33a, consisting, for example of polyester are represented by thin lines. The component elements of the slivers are represented by the standard threads 31b, 31c for the sliver 31, the standard threads 32b, 33c for the sliver 33. Such a textile material has ducts 35 between the stacked slivers.

Alternatively, instead of the slivers 31, 32, 33, unidirectional laps or webs could be used in the textile material of FIG. 4, in which case there would be no binding warps 31a, 32a, 33a.

Figure 5:
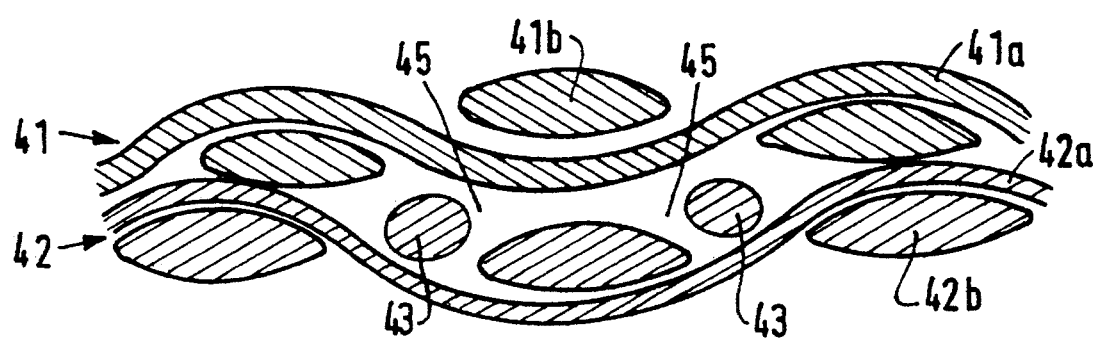
FIG. 5 is a schematic design, in section, of another embodiment of the material according to the present invention.

FIG. 5 illustrates an alternative embodiment of textile material according to the invention, in which unit threads are placed in a stack of layers of conventional fabrics. The material shown comprises two layers 41, 42 consisting of traditional fabrics respectively comprising interlaced threads 41a, 41b and 42a, 42b. According to the invention, unit threads 43 are arranged between the fabrics 41, 42, so that ducts 45 are formed near these threads in the stack of two fabrics. In the alternative version shown schematically in FIG. 5, the threads 43 are placed in the textile material in situ, but this does not apply, for example, to the material of FIG. 2, in which the layer 20 comprises a preformed fabric.

The invention can be used for the injection molding of composite articles with a wide variety of conventional resins, namely, in particular, epoxy, phenolic, bismaleimide, acrylic, polyester resins and the like. The best results have been obtained with resins which do not have too high of a viscosity at the time of the injection, for example a viscosity not exceeding 10 mPa.s (millipascals per second). However, these particulars are in no way critical, and a person skilled in the art can select the type of resin for the particular type of composite article to be produced.

The invention and its advantages will be illustrated further by means of the practical examples described below.

EXAMPLE 1

Tests with a Textile Material Based on Glass Fibers

In these tests, the mold assembly of FIG. 3 was used under the following conditions:

(1) with three layers of glass fabric of 300 g/m², each layer having ducts (material according to the invention), (2) with two outer layers of conventional glass fabric of 300 g/m², neither of the layers having any ducts, and a central layer of glass fabric of 300 g/m² having ducts (material according to the invention), (3) with three layers of glass fabric of 300 g/m², none of the layers having ducts (no material according to the invention).

The types of fabrics had the same weave: twill 2 lie 2.

The resin used was epoxy resin XB3052A (with hardener B) produced by Ciba-Geigy. The residual pressure in the mold was approximately 5 millibars.

The results obtained are collated in the following table 1. The distance covered by the resin in the mold (in relation to the length L=85 cm of the latter) over a given time was measured.

TABLE 1

|     | length of flow (cm) | time (min)    |
|-----|---------------------|---------------|
| (1) | 85                  | 1.5           |
| (2) | 45                  | 1.5           |
|     | 85                  | 2.5           |
| (3) | 10                  | 2             |
|     |                     | (resin block) |

EXAMPLE 2

Tests with a Textile Material Based on Carbon Fibers with 3,000 Filaments

The tests were conducted in a similar way to example 1 under the following conditions:

(1) with three layers of carbon fabric of 195 g/m², each layer having ducts, (2) with two outer layers of carbon fabric of 195 g/m², neither of the layers having any ducts, and a central layer of carbon fabric of 195 g/m² having ducts, (3) with three layers of carbon fabric of 195 g/m², none of the layers having any ducts.

The resin used was epoxy resin XB3052A (with hardener B) produced by Ciba-Geigy.

The residual pressure in the mold was 5 millibars.

The carbon fibers were Toray fibers with 3,000 filaments.

Furthermore, the two types of fabrics were produced from the same carbon fiber and had the same weave: taffeta.

The results obtained are collated in table 2.

TABLE 2

|     | Length of flow       |
|-----|----------------------|
| (1) | 85 cm (within 6 min.)|
| (2) | 60 cm (resin block)  |
| (3) | 25 cm (resin block)  |

The tests of examples 1 and 2 clearly show the advantages of the present invention with regard to both the length of flow of the resin over a given time and the injection time required for injecting resin over a given distance.

These tests also show that the use of a layer of fabric having ducts in a stack of layers makes it possible to increase the impregnation distance very substantially.

With the present invention, it is possible to increase the molding rates substantially and even carry out the injection molding of composite articles with textile reinforcements which could not be produced in the prior art, as shown by the above comparative tests, in some of which there was blockage of the resin. In such cases, the article obtained is defective, and this can cause very serious problems when such composite materials are used, for example, in the aeronautics industry.

EXAMPLE 3

A fabric according to the invention having the following characteristics was produced:

| width              | 120 cm                       |
|--------------------|------------------------------|
| weave              | satin 4                      |
| type of thread     |                              |
| *warp              | aramide threads 1267         |
|                    | Dtex non twisted             |
| *weft              | aramide threads 1267         |
|                    | Dtex                         |
|                    | twisted at 80 turns          |
|                    | per meter                    |
| mass per unit area | 175 ± 18 g/m²                |
| compactness        |                              |
| *warp              | 67 ± 3.5 threads/10 cm       |
| *weft              | 65 ± 3.5 threads/10 cm       |
| thickness          | 9.25 ± 0.03 mm.              |

Such fabric thus has, in its weft direction, continuous ducts obtained as a result of the twist imparted to the threads.

From such a material, a stack comprising ten identical laps is produced, thus having a thickness of approximately 2.5 mm, a length of 2 m and a width of 0.5 m.

The vacuum-injection molding of such a material is easy to carry out, impregnation being uniform and constant from the periphery to the center, over the entire thickness of the stack.

EXAMPLE 4

A fabric according to the invention having the following characteristics was produced:

| width              | 120 cm                          |
|--------------------|---------------------------------|
| weave              | twill 2 lie 2                   |
| type of thread     |                                 |
| *warp              | glass threads 68 × 4 twisted    |
|                    | at 150 turns direction Z        |
| *weft              | glass threads 272 Tex twisted   |
|                    | at 20 turns direction Z         |
| mass per unit area | 300 ± 15 g/m²                   |
| compactness        |                                 |
| *warp              | 56 ± 3.0 threads/10 cm          |
| *weft              | 52 ± 3.0 threads/10 cm          |
| thickness          | 0.36 ± 0.04 mm.                 |

Thus, such a fabric has, in its warp direction, continuous channels obtained as a result of the twist imparted to the warp threads.

As in example 3, from such a material a stack comprising ten identical laps was produced, this reinforcement thus having a thickness of approximately 3.6 mm, its length and width being the same as in the preceding example.

Once again, the vacuum-injection molding of such a material is easy to carry out, impregnation being uniform and constant from the periphery to the center, over the entire thickness of the stack.

EXAMPLE 5

A fabric according to the invention having the following characteristics was produced:

| width | 100 cm |
|---|---|
| weave | taffeta |
| type of thread | |
| *warp | carbon threads 3K Non-twisted alternation of a non-twisted |
| *weft | carbon thread with a 3K carbon thread covered with a polyester thread at 260 turns per meter |
| mean weight | $195 \pm 8$ g/m$^2$ |
| compactness | |
| *warp | $4.9 \pm 2$ threads/cm |
| *weft | 1) $2.4 \pm 2$ threads/cm of non-covered carbon thread |
| | 2) $2.4 \pm 2$ threads/cm of covered carbon thread |

Thus, such a fabric has, in its weft direction (crosswise), continuous ducts which are formed around the covered threads, and in the space defined between the non-covered weft threads and the covered threads.

As in the preceding examples, it is possible to produce a textile reinforcement having a large number of superposed laps from such a material, vacuum-injection molding again being carried out easily with uniform and constant impregnation.

The textile reinforcements having a large thickness and consisting of a plurality of laps of such a material can also be molded easily as a result of vacuum-injection.

The preceding examples clearly show the advantages afforded by the invention, particularly the fact that it is possible to ensure perfect impregnation by the vacuum-injection of even a high content of textile reinforcing material.

Moreover, although, in some of the preceding examples, all the layers of the stack were produced from a material having ducts, it was also found that it was sufficient for only one of these layers, arranged in the central zone of the stack, to be material according to the invention, and that all the other layers arranged on either side of this intermediate layer could be textile material not having such a characteristic, in order to likewise obtain an excellent distribution of the resin over the entire width and thickness of said stack.

For comparison, similar tests conducted with fabrics having the same compactness and the same weaves as those of the preceding examples 3 to 5, but in which none of the threads had been twisted or covered, showed that, if the same procedure using vacuum-injection was carried out in a stack formed from the same number of layers, on a panel having the same dimensions, the penetration of the resin within the panel was blocked very quickly and did not reach the center.

As a result of the invention, it is therefore possible to obtain, by means of a very simple and very reliable injection technique, articles having very high textile reinforcement counts which have been impossible to produce hitherto by means of a similar injection technique and which have only been possible to produce by means of expensive and complex techniques, such as those using autoclaves.

Thus, as a result of the invention, it is possible, by using a vacuum and/or pressure injection process with reinforcing materials, at least one layer of which has ducts, to obtain laminated (composite) articles having advantageous technical characteristics, with:

a low investment, a high and easily adjustable production rate, the possibility of producing large-size articles.

Thus, the textile material of the present invention, subjected to resin injection to provide articles having high mechanical characteristics, affords the following advantages:

(1) by the use of a vacuum alone, it is possible to produce large articles and, quite specifically, articles comprising high-performance carbon-type fibers which are suitable for replacing contact molded unuitary articles;

(2) by the use of vacuum and pressure, it is possible:
to increase the production rates, reliability and reproducibility, of a wide range of reinforcements including those comprising glass fibers;
to use resins which are more efficient in mechanical and thermal terms and/or are more reactive in high-performance reinforcement.

The advantages are even more pronounced in articles having a highly anisotropic structure.

Of course, the invention is not limited to the examples given above, but embraces all the alternative versions produced in the same spirit: for example, the textile reinforcing material could be based on any material other than those used in the given examples, and the weaves of the fabrics could also be modified.

The preceding description dealt, above all, with textile materials comprising threads which, as a result of their compactness or their arrangement within the material, facilitate the formation of ducts in the stack serving as a textile reinforcement. However, it goes without saying that equivalent results can be obtained with textile components other than threads, for example, components such as rods or hybrid threads which are also capable of facilitating the formation of ducts in the stack.

It will be noted that, during the injection of resin and the production of the composite article, the ducts are preserved in full up until the impregnation of the reinforcement with the resin is completed. Once the article has been produced, the ducts can be kept as they are or, in other cases, no longer appear as such in the final article. According to the main feature of the invention, such ducts are present inside the textile reinforcement at the time of the molding injection process.

Thus, this invention makes it possible to obtain any of highly diverse articles which come within its scope. It will be appreciated that a person skilled in the art can make modifications to the components capable of forming the ducts in the stack, without thereby departing from the scope of the claimed invention.

What we claim is:

1. Textile reinforcing material including a stack of layers of textile reinforcements, at least one of said layers comprising a fabric comprising substantially flat multifilament threads and substantially round threads forming ducts in said at least one layer, wherein (1) said substantially round threads have been formed from substantially flat multifilament threads helically wrapped in nonadjoining turns with an additional thread, and (2) said substantially round threads are uniformly distributed in said at least one layer.

2. Textile reinforcing material as claimed in claim 1, wherein said substantially round threads extend continuously across the stack.

3. Textile reinforcing material as claimed in claim 1, wherein said substantially round threads extend adjacent one another across the entire width of the stack.

4. Textile reinforcing material as claimed in claim 1, wherein said substantially round threads are spaced apart from one another in the stack.

5. Textile reinforcing material as claimed in claim 1, wherein each of said substantially round threads extends in a substantially straight line.

6. Textile reinforcing material as claimed in claim 1, wherein said substantially round threads are curvilinear.

7. Textile reinforcing material as claimed in claim 1, wherein said substantially round threads extend parallel to one another.

8. Textile reinforcing material as claimed in claim 1, wherein said substantially round threads are skewed relative to one another.

9. Textile reinforcing material as claimed in claim 1, wherein said at least one layer comprises a fabric selected from the group consisting of monolayer fabrics and multilayer fabrics.

10. Textile reinforcing material as claimed in claim 1, wherein said at least one layer comprises a fabric selected from the group consisting of planar monolayer woven fabrics, planar monolayer knitted fabrics, nonwoven unidirectional fabrics, nonwoven multidirectional fabrics and planar multilayer fabrics.

11. Textile reinforcing material as claimed in claim 1, wherein said substantially round threads and substantially flat multifilament threads are made from fibers selected from the group consisting of glass fibers, carbon fibers, silicon carbide fibers, aramide fibers and boron fibers.

12. A warp and weft fabric comprising substantially flat multifilament threads and substantially round multifilament threads, wherein said substantially round multifilament threads are helically wrapped by an additional thread in nonadjoining turns, forming ducts in said fabric.

13. A warp and weft fabric as claimed in claim 12, wherein all of the warp threads or all of the weft threads are wrapped with an additional thread.

* * * * *